(12) United States Patent
Nuspl et al.

(10) Patent No.: US 7,807,121 B2
(45) Date of Patent: Oct. 5, 2010

(54) LITHIUM METAL PHOSPHATES, METHOD FOR PRODUCING THE SAME AND USE THEREOF AS ELECTRODE MATERIAL

(75) Inventors: Gerhard Nuspl, Forstern (DE); Lucia Wimmer, Landshut (DE); Max Eisgruber, Bruckberg (DE)

(73) Assignee: Sud-Chemie AG, Munich (DE)

( * ) Notice: Subject to any disclaimer, the term of this patent is extended or adjusted under 35 U.S.C. 154(b) by 1129 days.

(21) Appl. No.: 10/578,032

(22) PCT Filed: Nov. 14, 2004

(86) PCT No.: PCT/EP2004/012911

§ 371 (c)(1), (2), (4) Date: May 2, 2006

(87) PCT Pub. No.: WO2005/051840

PCT Pub. Date: Jun. 9, 2005

(65) Prior Publication Data

US 2007/0054187 A1    Mar. 8, 2007

(30) Foreign Application Priority Data

Nov. 14, 2003   (DE) ................ 103 53 266

(51) Int. Cl.
*C01B 25/45* (2006.01)
(52) U.S. Cl. .............. 423/306; 429/220; 429/221; 429/223; 429/224; 429/229; 429/231.95
(58) Field of Classification Search .............. 423/306
See application file for complete search history.

(56) References Cited

U.S. PATENT DOCUMENTS 5,910,382 A    6/1999   Goodenough 6,815,122 B2 *  11/2004  Barker et al. ............. 429/231.9
7,348,100 B2 *   3/2008  Adamson et al. .......... 429/218.1
7,416,803 B2 *   8/2008  Haile et al. .................. 429/33

(Continued)

FOREIGN PATENT DOCUMENTS

| EP | 1 094 523 | 4/2001 |
|----|-----------|--------|
| JP | 2002/151082 | 5/2002 |

OTHER PUBLICATIONS

Arnold, G. et al., *Fine-particle lithium iron phosphate LiFePO4 synthesided by a new low-cost aqueous precipitation technique*, Journal of Power Sources 119-121 (2003), pp. 247-251.

Chung, S., et al., *Electronically conductive phospho-olivines as lithium storage electrodes*, Nature Materials, vol. 1 (2002), pp. 123-128.

Franger, S., et al., *Comparison between different LiFePO4 synthesis routes and their influence on its physico-chemical properties*, Journal of Power Sources 119-121 (2003), pp. 252-257.

Padhi, A.K., et al., *Phospho-olivines as Positive-Electrode Materials for Rechargeable Lithium Batteries*, J. Electrochem. Soc., vol. 114 (1997), pp. 1188-1194.

(Continued)

*Primary Examiner*—Wayne Langel
(74) *Attorney, Agent, or Firm*—Millen, White, Zelano, Branigan, P.C.

(57) ABSTRACT

The invention describes a process for producing a compound of the formula $LiMPO_4$, in which M represents at least one metal from the first transition series, comprising the following steps: a) production of a precursor mixture, containing at least one $Li^+$ source, at least one $M^{2+}$ source and at least one $PO_4^{3-}$ source, in order to form a precipitate and thereby to produce a precursor suspension; b) dispersing or milling treatment of the precursor mixture and/or the precursor suspension until the D90 value of the particles in the precursor suspension is less than 50 μm; and c) the obtaining of $LiMPO_4$ from the precursor suspension obtained in accordance with b), preferably by reaction under hydrothermal conditions. The material obtainable by this process has particularly advantageous particle size distributions and electrochemical properties when used in electrodes.

39 Claims, 3 Drawing Sheets

U.S. PATENT DOCUMENTS

| | | | |
|---|---|---|---|
| 7,670,721 B2 * | 3/2010 | Wurm et al. | 429/221 |
| 2003/0124423 A1 | 7/2003 | Sasaki | |
| 2004/0151649 A1 | 8/2004 | Hemmer | |
| 2004/0175614 A1 | 9/2004 | Wurm | |
| 2004/0202935 A1 * | 10/2004 | Barker et al. | 429/231.9 |
| 2005/0255026 A1 * | 11/2005 | Barker et al. | 423/306 |
| 2008/0099720 A1 * | 5/2008 | Huang et al. | 252/182.1 |
| 2009/0111024 A1 * | 4/2009 | Wurm et al. | 429/221 |

OTHER PUBLICATIONS

Ravet, N., et al., *Improved Iron Based Cathode Material*, Abstract No. 127 (1999).

Tajimi, S., et al., *Enhanced electrochemical performance of LiFePO4 prepared by hydrothermal reaction*, Solid State Ionics 175 (2004), pp. 287-290.

Yang, S., et al., *Hydrothermal synthesis of lithium iron phosphate cathodes*, Electrochemistry Communications 3 (2001), pp. 505-508.

\* cited by examiner

LITHIUM METAL PHOSPHATES, METHOD FOR PRODUCING THE SAME AND USE THEREOF AS ELECTRODE MATERIAL

The present invention relates to a process for producing lithium iron phosphate, to the material obtainable by this process having a very small particle size and a narrow particle size distribution, and to its use in particular in a secondary battery.

The use of synthetic lithium iron phosphate ($LiFePO_4$) as an alternative cathode material in lithium ion batteries is known from the prior art. This was described for the first time in A. K. Padhi, K. S. Nanjundaswamy, J. B. Goodenough, J. Electrochem. Soc. Vol. 144 (1977) and is also disclosed, for example, in U.S. Pat. No. 5,910,382.

The use of phosphates, such as lithium iron phosphate, as positive electrode for secondary lithium batteries is also described in WO 02/099913 A1, in which, to produce from an equimolar aqueous solution of $Li^+$, $Fe^{3+}$ and $PO_4^{3-}$, the water is evaporated so as to produce a solids mixture, after which the solids mixture is decomposed at a temperature below 500° C. in order to produce a pure Li and Fe phosphate precursor, and an $LiFePO_4$ powder is then obtained by reacting the precursor at a temperature of below 800° C. in a reducing atmosphere.

Other sintering processes, as they are known, are known from the prior art. Drawbacks include firstly the high materials costs of the starting chemicals (e.g. iron oxalate). The consumption of protective gas during the sintering process is also considerable, and toxic by-products, such as CO, are formed during sintering. It has also been discovered that the particle size distribution of the product is often very wide and bimodal. Further production processes are known, for example, from WO 02/083555, EP 1 094 523 A1, US 2003/0124423 and Franger et al., Journal of Power Sources 119-121 (2003), pp. 252-257.

JP 2002-151082 A also describes lithium iron phosphate, processes for producing it and a secondary battery which uses it. The process for producing lithium iron phosphate is characterized in that a lithium compound, a divalent iron compound and a phosphoric acid compound are mixed with one another in such a way that at least the molar ratio of the divalent iron ions and the phosphoric acid ions is approximately 1:1, and the mixture is made to react in a temperature range from at least 100° C. up to at most 200° C. in a tightly closed vessel with the addition of a polar solvent and an inactive gas. The lithium iron phosphate obtained in this way can then be physically comminuted.

Although usable lithium iron phosphate can already be obtained using the processes according to the prior art, the conventional production processes nevertheless have the drawback that it is not possible to obtain pulverulent lithium iron phosphate with a very small particle size and a very narrow particle size distribution.

Therefore, there is a considerable demand for suitable processes for producing a lithium iron phosphate with a very small particle size and a very narrow particle size distribution which can be successfully incorporated into the electrode material of a secondary battery, where it has very good electrochemical properties.

Therefore, it was an object of the present invention to provide a process for producing lithium iron phosphate which avoids the drawbacks of the prior art and in particular provides material which is especially suitable for electrodes of rechargeable batteries.

The above object is achieved, according to the invention, by the process according to claim 1. Advantageous or preferred refinements are given in the subclaims.

The process according to the invention can be used not only to produce $LiFePO_4$ but also to produce other compounds of the general empirical formula $LiMPO_4$, in which M represents at least one metal from the first transition series. In general, M is selected from at least one metal belonging to the group consisting of Fe, Sc, Ti, V, Cr, Mn, Co, Ni, Cu, Zn, Be, Mg, Ca, Sr, Ba, Al, Zr and La. M is particularly preferably selected from Fe, Mn, Co and/or Ni. Preferably, however, M comprises at least Fe.

It is also possible for M to stand for two or more transition metals in the compound $LiMPO_4$; by way of example, the iron in $LiFePO_4$ may be partially replaced by one or more other metals selected from the above group, e.g. by Zn. $LiFePO_4$ is particularly preferred. The process according to the invention preferably gives $LiMPO_4$ in pure-phase form.

Therefore, according to the invention it has surprisingly been discovered that a very narrow particle size distribution and a very small particle size of the end product, $LiMPO_4$, can be achieved in a process for producing $LiMPO_4$ by an intensive dispersing or milling treatment of a precursor mixture or suspension containing at least one $Li^+$ source, at least one $M^{2+}$ source and at least one $PO_4^{3-}$ source.

The use according to the invention of the dispersing or milling treatment of the precursor mixture results in intensive mixing and, at the same time, deagglomeration or a reduction in the size of the particle aggregates in the suspension. This is not achieved by conventional stirring at a low speed.

Any apparatus which appears suitable to the person skilled in the art and allows sufficient shearing forces or turbulence to be generated to achieve intensive mixing and, at the same time, deagglomeration or a reduction in the size of the particle aggregates in the suspension, resulting in a D90 value of less than 50 µm, can be used to carry out the dispersing or milling treatment according to the invention. Preferred apparatuses comprise dispersing means (with or without pump rotors), Ultraturrax, mills such as colloid mills or Manton-Gaulin mills, intensive mixers, centrifugal pumps, in-line mixers, mixing nozzles, such as injector nozzles, or ultrasound appliances. Apparatuses of this type are known per se to the person skilled in the art. The settings required to obtain the desired effect on the mean particle size in the precursor suspension (cf. above) can be determined using routine tests according to the particular type of apparatus.

In many cases, as part of the dispersing or milling treatment according to the invention, power is introduced into the precursor suspension at a level of at least 5 $kW/m^3$ of the mixture or suspension to be treated, in particular at least 7 $kW/m^3$. This introduction of power can be determined in a known way for the particular apparatus, for example using the formula $P=2·\pi·n·M$, where M represents the torque and n represents the rotational speed, when using an Ultraturrax stirrer.

According to a further preferred embodiment of the invention, the energy introduced into the precursor suspension within the dispersing or milling treatment according to the invention will be at least 5 $kWh/m^3$ of the mixture or suspension to be treated, in particular at least 7 $kWh/m^3$. In this case, it is preferable, although not imperative, also to comply with the values indicated above for the introduction of power.

Surprisingly, it has also been discovered that comminution of the finished $LiMPO_4$ instead of the dispersing or milling treatment during the production according to the invention does not lead to corresponding advantageous properties of the $LiFePO_4$ powder, even if it is attempted to obtain comparable even if it is attempted comparable particle size distributions.

It is assumed, without the invention being restricted to this theoretical mechanism, that with the dispersing or milling treatment according to the invention in particular the large crystal agglomerates which initially form during production of the mixed suspension are prevented, or at least the extent to which they are formed is reduced. These crystal agglomerates may also (in part) be attributable to phosphates of $Li^+$ and $M^{2+}$ as intermediate products which, depending on their concentration, may lead to an increase in the viscosity on account of the formation of larger crystal platelets and/or agglomerates. According to a particularly preferred embodiment of the invention, therefore, it is also possible for apparatuses whose high mixing action (or shearing action) is sufficient to prevent the formation of large crystallites or crystallite agglomerates in the mixture or suspension and, at the same time, to produce a high nucleation rate to be used for the dispersing treatment of the precursor mixture or suspension. Non-limiting examples of suitable apparatuses have already been mentioned above.

The said crystal aggregates or crystal platelets can also be formed through precipitation of a defined precursor product from a soluble $Li^+$ source, a soluble $M^{2+}$ source and the (soluble) $PO_4^{3-}$ source. In the example of the invention below, for example, an aqueous solution of an $Fe^{2+}$ source, in particular an aqueous solution of iron(II) sulphate heptahydrate, $FeSO_4.7H_2O$, and a liquid $PO_4^{3-}$ source, in particular 85% strength phosphoric acid, is taken as initial charge, and a fresh precipitate of aqueous LiOH solution, a fresh precipitate of vivianite ($Fe_3(PO_4)_2$ hydrate) is formed by the slow addition of an aqueous $Li^+$ source, in particular an aqueous LiOH solution. In this context, it is preferable for the dispersing or milling treatment to prevent or reduce the extent of formation of large crystal platelets or crystal agglomerates even before the start of initial crystal formation all the way through to the end of the precipitation. Prior to a subsequent preferred hydrothermal treatment, a homogenous precursor mixture or suspension, preferably with a solids content containing Vivianite (if appropriate impregnated with $Li^+$ ions), lithium phosphate and/or iron hydroxides, is then present using the dispersing or milling unit. This (these) intermediate product(s) need not be isolated. It is preferable for the precursor mixture or suspension to be combined and/or precipitated while it is in the hydrothermal vessel (1-pot process).

The dispersing or milling treatment according to the invention therefore ensures that the precipitation takes place very homogenously and a homogeneous mixture comprising a large number of small crystal nuclei of approximately the same size is formed. These crystal nuclei can then, in particular during a subsequent hydrothermal treatment, be reacted to form uniformly grown crystals of the end product $LiMPO_4$ with a very narrow particle size distribution. In principle, in the context of the invention as an alternative to the hydrothermal treatment it is also possible, if appropriate after the mother liquor has been separated off, for example by filtration and/or centrifuging, to dry and if appropriate sinter the precipitate formed from the precursor mixture following the dispersing or milling treatment according to the invention. However, the hydrothermal treatment is preferred and gives optimum results.

To obtain the desired effect, the dispersing or milling treatment according to the invention may therefore preferably start before or during the formation of a precipitate from the precursor mixture, in order to prevent the formation of large crystal nuclei or agglomerates and/or to comminute and homogenize such nuclei or agglomerates. The intention is to achieve a D90 value of the particles in the suspension of less than 50 μm. A D90 value of the particles in the precursor suspension of at most 25 μm is preferred, in particular at most 20 μm, particularly preferably at most 15 μm, since these values have revealed to provide the best properties in the finished product.

According to one embodiment of the invention, the dispersing or milling treatment according to the invention can also take place after the formation of a precipitate from the precursor mixture, provided that the abovementioned D90 value is achieved.

Surprisingly, it has also been discovered that the dispersing or milling treatment according to the invention should preferably take place before the final reaction to form the lithium iron phosphate, in particular before the end of a hydrothermal treatment which follows the precipitation of the precursor mixture, in order to achieve optimum results. However, a treatment of a precursor mixture both before and during a hydrothermal treatment is regarded as being a dispersing or milling treatment according to the invention.

One significant advantage of the process according to the invention is that the particle size distribution of the $LiMPO_4$ produced can be controlled in a particularly reproducible way, and consequently the good electrochemical properties can also be stably maintained without extensive fluctuations.

In the present invention, there are fundamentally no restrictions on the choice of the $Li^+$ source, the $M^{2+}$ source and the $PO_4^{3+}$ source. It is possible to use all starting materials which are familiar or appear suitable to the person skilled in the art. It is possible to suitably combine a very wide range of lithium compounds, divalent compounds of M and phosphoric acid compounds as synthesis raw materials. Soluble salts or compounds of Li and M and liquid or soluble $PO_4$ sources are preferred. Lithium fluoride, lithium chloride, lithium bromide, lithium iodide, lithium carbonate, lithium hydroxide or lithium phosphate, inter alia, can be cited as non-limiting examples of suitable lithium compounds. LiOH is particularly preferred.

Iron fluoride, iron chloride, iron bromide, iron iodide, iron sulphate, iron phosphate, iron nitrate, organyl salts of iron, such as iron oxalate or iron acetate, inter alia, can be cited as non-limiting examples of divalent compounds of M, in this case, for example with M=Fe. Iron sulphate is particularly preferred. If M represents a metal other than Fe, it is possible to use the corresponding compounds.

Orthophosphoric acid, metaphosphoric acid, pyrophosphoric acid, triphosphoric acid, tetraphosphoric acid, hydrogen phosphates or dihydrogen phosphates, such as ammonium phosphate or ammonium dihydrogen phosphate, lithium phosphate or iron phosphate or any desired mixtures thereof, inter alia, can be mentioned as non-limiting examples of phosphoric acid compounds. Phosphoric acid is particularly preferred.

Moreover, if LiOH is used as $Li^+$ source and phosphoric acid is used as $PO_4^{3-}$ source, it is possible to neutralize the phosphoric acid by the addition of LiOH and thereby to initiate the precipitation in the precursor mixture.

According to the invention, any liquid or fluid mixture containing at least one $Li^+$ source, at least one $M^{2+}$ source and at least one $PO_4^{3-}$ source are regarded as a precursor mixture.

According to the invention, any liquid or fluid precursor mixture after at least partial formation of a precipitate is regarded as a precursor suspension. The precipitate may contain $LiMPO_4$ or intermediate products.

In general, the precursor mixture will contain a solvent, in particular a polar solvent. Examples of polar solvents which may be mentioned include water, methanol, ethanol, 2-propanol, ethylene glycol, propylene glycol, acetone, cyclohexanone, 2-methyl pyrollidone, ethyl methyl ketone, 2-ethoxyethanol, propylene carbonate, ethylene carbonate, dimethyl carbonate, dimethyl formamide or dimethyl sulphoxide or mixtures thereof. Water is the preferred solvent. The wet precipitation of the $LiMPO_4$ from aqueous solution, which is preferred according to the invention, can then take place. According to the invention, therefore, it is then possible to start from the known starting materials or solutions or suspensions which are familiar to the person skilled in the art for the production of the $LiMPO_4$. In particular, it is possible to use the formulations and processes which are known for wet precipitation from solutions, with the dispersing or milling treatment being provided in addition according to the invention. The temperature used during the production of the precursor mixture or during the combining of the at least one $Li^+$ source, the at least one $M^{2+}$ source and/or the at least one $PO_4^{3-}$ source is preferably selected to lie in the range between approximately 20 and 80° C., in particular between 25 and 60° C.

According to a preferred embodiment of the process according to the invention, there is no direct evaporation or drying of the precursor mixture or precursor suspension. Also, according to a preferred embodiment there is no sintering of the precursor mixture or precursor suspension, since this can have an adverse effect on the properties of the end product obtained. Rather, it has surprisingly been found that the best results are obtained by a hydrothermal treatment of the precursor mixture or precursor suspension, followed by drying and if appropriate sintering of the fully reacted $LiFePO_4$.

In the context of the present invention, the term conversion of the precursor mixture under hydrothermal conditions is to be understood as meaning any treatment at a temperature above room temperature and a steam pressure of above 1 bar. The hydrothermal treatment per se can be carried out in a manner known and familiar to the person skilled in the art. It is preferable for temperatures of between 100 to 250° C., in particular from 100 to 180° C. and a pressure of from 1 bar to 40 bar, in particular from 1 bar to 10 bar steam pressure, to be used for the hydrothermal conditions. One example of a possible hydrothermal process is described in JP 2002-151082, the content of disclosure of which in this respect is hereby incorporated by reference. In this case, according to one embodiment, the precursor mixture is reacted in a tightly closed or pressure-resistant vessel. The reaction preferably takes place in an inert or protective gas atmosphere. Examples of suitable inert gases include nitrogen, argon, carbon dioxide, carbon monoxide or mixtures thereof. The hydrothermal treatment may, for example, be carried out for 0.5 to 15 hours, in particular for 3 to 11 hours. Purely as a non-limiting example, the following specific conditions may be selected: 1.5 h heat-up time from 50° C. (temperature of the precursor mixture) to 160° C., 10 h hydrothermal treatment at 160° C., 3 h cooling from 160° C. to 30° C.

According to a preferred embodiment of the invention, first of all the $M^{2+}$ source and the $PO_4^{3-}$ source are mixed in an aqueous medium, in particular under an inert gas atmosphere, and then, preferably once again under an inert gas atmosphere, the $Li^+$ source is added. At the latest when the precipitation commences with increasing neutralization of the precursor mixture, the dispersing or milling treatment is then commenced, followed by the reaction under hydrothermal conditions. The hydrothermal treatment may, according to one embodiment of the invention, be followed by separation of the $LiMPO_4$ from the suspension, e.g. by filtration and/or centrifuging. Furthermore, according to one embodiment of the invention, the $LiMPO_4$ which has been separated off can be washed, in particular with water, in order to reduce or remove the salt load. Drying and/or sintering of the $LiMPO_4$, in particular under a protective gas or inert atmosphere, may likewise follow the hydrothermal treatment. Careful drying/redrying is generally required for the electrochemical quality of the end product, since even slight traces of moisture may cause problems, such as decomposition of the conductive salt $LiPF_6$, during electrochemical use of the material in Li (storage) batteries. Sintering may optionally be carried out.

The drying of the $LiMPO_4$ can be carried out over a wide temperature range from approximately 50 to 750° C., the drying temperature also being dependent on economic considerations. If the $LiMPO_4$ is produced in the absence of a carbon-containing or electron-conducting substance or a precursor thereof (cf. below), in most cases drying at between approximately 50 and 350° C., for example for 3 h at 250° C. using nitrogen 5.0, vacuum or forming gas, will be sufficient.

If the production of the $LiMPO_4$ is carried out in the presence of a carbon-containing or electron-conducting substance or a precursor thereof (cf. below), in order to effect precoating with carbon, a higher drying temperature, generally above 500 or 700° C., will generally be selected. In particular, sintering may be carried out, in which case, for example, heating is carried out for 3 h at approximately 750° C. using nitrogen 5.0. The desired conductive covering of the carbon-containing or electron-conducting substance is only obtained at sufficiently high temperatures. According to a preferred embodiment of the invention, the components of the precursor mixture are present in the following stoichiometric ratio:

a. 1 mole $Fe^{2+}$:1 mole $PO_4^{3-}$:1 mole Li* (1:1:1)
b. 1 mole $Fe^{2+}$:1 mole $PO_4^{3-}$:3 mol Li* (1:1:3)
c. any mixing ratio between a and b.

It is preferable for at least the molar ratio of $M^{2+}$ iron ions to $PO_4^{3-}$ to be approximately 1:1. Also, the stoichiometric ratios given above are preferred for economic ratios are also for economic reasons, but are not imperative. In particular in the hydrothermal process, $LiMPO_4$ preferentially forms as the most thermodynamically stable phase, and moreover deviations from the abovementioned ratios may in some cases even be intentional in order to influence the precipitation or morphological properties. In general, it is even possible to tolerate deviations of 20%, or at least of approximately 10%, from the stoichiometric ratios given above.

The hydrothermal process also offers advantages with regard to a greatly reduced demand for protective gas compared to an alternatively possible sintering process from a dry powder premix or precursor mixture. Moreover, it has surprisingly been discovered that the particle morphology and particle size distribution can be controlled a great deal more accurately than with a pure sintering process.

Excessively large $LiFePO_4$ particles lead, at high charge/discharge rates (high charge/discharge currents), to a kinetically controlled limiting of the capacity which can be taken from a storage battery, i.e. during discharge the lithium ions can no longer migrate sufficiently quickly through the $LiFePO_4/FePO_4$ boundary layer, so that the specific capacity of the electrode drops considerably at high charge/discharge rates. However, a sufficient specific capacity even at high charge/discharge currents is important for commercial use of the lithium iron phosphate.

The tests carried out by the inventors have also shown that it is not possible to achieve either the same small particle size and narrow particle size distribution or the excellent electrochemical properties by simply remilling and/or screening the finished $LiMPO_4$ produced without the dispersing or milling treatment according to the invention. This also applies with regard to $LiMPO_4$ which has been produced simply by direct sintering of a powder precursor mixture. It is assumed that this is attributable to the uniform and small crystallization of nuclei which are produced by the dispersing or milling treatment according to the invention and form the basis of the reaction to give the finished LiMPO$_4$ product. The fine and uniform particle size obtained has a positive influence even in the event of drying or sintering of the LiMPO$_4$ produced using the process according to the invention.

Therefore, a further aspect of the present invention relates to LiMPO$_4$ obtainable by the process described above. This material preferably has a D$_{90}$ value of the particles of at most 25 µm, in particular at most 20 µm, particularly preferably at most 15 µm. The mean (average) particle size (D50 value) is less than 0.8 µm, preferably less than 0.7 µm, in particular less than 0.6 µm, particularly preferably less than 0.5 µm. The particle size distribution is preferably at least substantially a normal distribution (monomodal). According to one embodiment, the D10 value is less than 0.35 µm, preferably less than 0.40 µm, but may also be higher with narrow particle size distributions, depending on the D90 value. The D90 value is preferably less than 3.0 µm, preferably less than 2.5 µm, in particular less than 2.0 µm.

The particle size distribution of the LiMPO$_4$ according to the invention is, as has already been mentioned above, preferably very narrow; according to a particularly preferred embodiment, the difference between the D90 value and the D10 value is no more than 2 µm, preferably no more than 1.5 µm, in particular no more than 1 µm, particularly preferably no more than 0.5 µm.

Surprisingly, it has emerged that the above-described advantages of the LiMPO$_4$ according to the invention also offer particular advantages during the subsequent processing with further components, e.g. carbon-containing materials during the production of electrode materials. For example, the LiMPO$_4$ according to the invention evidently, on account of its particular particle size distribution as defined herein, allows better and easier processing to form electrode materials and particularly intimate combining with, for example, the carbon-containing conductive materials. Consequently, yet another aspect of the present invention relates to a composition, in particular an electrode material, containing LiMPO$_4$ as defined herein.

A further aspect of the present invention relates to the use of an LiMPO$_4$ material as defined above in a lithium storage battery or a secondary (rechargeable) Li battery as electrode material. It is preferable for the primary particles (=crystallites) of the finished LiMPO$_4$ product to be substantially uniform in terms of size and morphology in SEM images. By contrast, LiMPO$_4$ which is not produced using the process according to the invention has primary particles of non-uniform sizes or non-uniform crystal morphologies.

According to a preferred embodiment of the invention, the production or precipitation of the precursor mixture and/or the reaction under hydrothermal conditions take place in the presence of further components, in particular an electron-conducting substance. This may preferably be a carbon-containing solid, such as carbon, in particular conductive carbon solid, such as carbon, in particular conductive carbon or carbon fibres. It is also possible to use a precursor of an electron-conducting substance or of the carbon-containing solid, which precursor is converted into carbon particles during drying or sintering of the LiMPO$_4$, an example being a sugar compound. Further examples of suitable organic compounds are mentioned in WO 02/083555, the content of disclosure of which in this respect is hereby incorporated by reference. It is preferable for the carbon particles contained in the finished LiMPO$_4$ product to be homogenously distributed. According to a particularly preferred embodiment according to the invention, the carbon-containing solid used is employed as a crystallization nucleus in the reaction of the precursor mixture.

In principle, however, any process with which the person skilled in the art is familiar is suitable for introducing carbon or carbon-containing, electrically conductive material and/or for mixing with further components. Intensive mixing or milling of the finished LiMPO$_4$ with at least one carbon-containing solid, such as conductive carbon, is also possible. Further possible processes include the drawing of carbon particles onto the surface of the LiMPO$_4$ particle in an aqueous or non-aqueous suspension or the pyrolysis of a mixture of LiMPO$_4$ powder and a carbon precursor material. The carbon-containing LiMPO$_4$ obtained in this way, for example, generally contains up to 10% by weight, preferably up to 5% by weight, particularly preferably up to 2.5% by weight, of carbon, based on the LiMPO$_4$.

A pyrolysis process in which at least one carbon precursor material, preferably a carbohydrate, such as sugar or cellulose, and particularly preferably lactose, is mixed with the LiMPO$_4$ powder according to the invention, for example by kneading, it being possible to add water as an auxiliary substance, is preferred in technical terms. According to one embodiment which is particularly preferred in technical terms, the carbon precursor material is added to the as yet undried, moist LiMPO$_4$ filter cake. Then, the mixture of LiMPO$_4$ powder according to the invention and carbon precursor material is dried under protective gas, in air or in vacuo at temperatures of preferably from 50° C. to 200° C. and heated under protective gas, such as for example nitrogen 5.0 or argon, to a temperature between, for example, 500° C. and 1000° C., preferably between 700° C. and 800° C., during which operation the carbon precursor material is pyrolysed to form carbon. This is preferably then followed by a milling or deagglomeration treatment.

According to a further preferred embodiment of the invention, the BET surface area of the LiMPO$_4$ used is more than approximately 3.5 m$^2$/g, in particular more than approximately 4 m$^2$/g, particularly preferably more than 5 m$^2$/g, more than 10 m$^2$/g or even more than 15 m$^2$/g, determined in accordance with DIN 66131 (multipoint determination).

An improvement to the properties of the LiFePO$_4$ by pre-coating with carbon is also described in: Ravet et al., Abstract No. 127, 196$^{th}$ ECS-Meeting, Honolulu, Hi., Oct. 17-22 (1999).

The carbon content also improves the processing properties of the LiMPO4 powder to form battery electrodes by changing the surface properties and/or improves the electrical connection in the battery electrode.

Alternatively, a significant improvement to the electron conductivity should be possible by targeted doping with Mg$^{2+}$, Al$^{3+}$, Ti$^{4+}$, Zr$^{4+}$, Nb$^{5+}$, W$^{6+}$ (S. Y. Chung, J. T. Bloking, Y. M. Chiang, Nature, Vol. 1, October 2002, 123).

A further aspect according to the invention relates to an Li storage battery or an Li secondary battery containing the (optionally carbon-containing) LiMPO$_4$ according to the invention. The secondary battery (lithium ion secondary battery) per se can in this case be produced in a manner known per se, for example as listed below and described in JP 2002-151082. In this case, the lithium iron phosphate of the present invention as obtained above is used at least as part of the material for the positive terminal of the secondary battery. In this case, first of all the lithium iron phosphate of the present invention is mixed with, if necessary, electrically conductive additives and a binder in accordance with a standard process for producing the positive electrode of a secondary battery. The secondary battery is then produced from this positive electrode and a material customarily used for the negative electrode, such as for example metallic lithium or a laminar carbon compound, such as for example graphite, and also from a non-aqueous electrolyte solution as is customarily used, for example propylene carbonate or ethylene carbonate or the like, in which a lithium salt, such as $LiBF_4$ or $LiPF_6$ is dissolved, is produced as the main constituents.

Determination of the Particle Size Distribution

The particle size distributions for the precursor suspensions and the $LiMPO_4$ produced is determined on the basis of the light-scattering method using commercially available equipment. The person skilled in the art will be familiar with this method, and in this context reference is also made to the disclosure given in JP 2002-151082 and WO 02/083555, which is hereby incorporated by reference. In the present case, the particle size distributions were determined with the aid of a laser diffraction measuring appliance (on Mastersizer S, Malvern Instruments GmbH, Herrenberg, Del.) and the manufacturer's software (Version 2.19) with a Malvern Small Volume Sample Dispersion Unit, DIF 2002 as measurement unit. The following measurement conditions were selected: Compressed range; active beam length 2.4 mm; measurement range: 300 RF; 0.05 to 900 µm. The specimen preparation and measurement were carried out in accordance with the manufacturer's instructions.

The D90 value indicates the value at which 90% of the particles in the measured sample have a particle diameter which is smaller than or equal to this value. Accordingly, the D50 value and the D10 value indicate the values at which 50% and 10% of the particles in the measured sample have a particle diameter smaller than or equal to these values.

According to one particularly preferred embodiment of the invention, the values cited in the present description for the D10 values, the D50 values, the D90 values and the difference between the D90 and D10 values are based on the proportion by volume of the respective particles within the total volume. According to this embodiment of the invention, the D10, D50 and D90 values disclosed herein then indicate the values at which 10% by volume, 50% by volume and 90% by volume, respectively, of the particles in the measured sample have a particle diameter smaller than or equal to the value indicated. According to the invention, if these values are maintained, particularly advantageous materials are provided and negative influences of relatively coarse particles (in a relatively large proportion by volume) on the processing properties and the electrochemical product properties are avoided. It is particularly preferable for the values given in the present description for the D10 values, the D50 values, the D90 values and the difference between the D90 and D10 values to be based both on percent and percent by volume of the particles.

In the case of compositions (e.g. electrode materials) which, in addition to the $LiMPO_4$ contain further components, in particular in the case of carbon-containing compositions, the above light-scattering method can lead to misleading results, since the $LiMPO_4$ particles may be joined by the additional (e.g. carbon-containing) material to form larger agglomerates. However, the particle size distribution of the $LiMPO_4$ in compositions of this type can be determined on the basis of SEM images in the following way:

A small quantity of the powder sample is suspended in acetone and dispersed using ultrasound for 10 mins. Immediately thereafter, a few drops of the suspension are applied to a specimen slide of a scanning electron microscope (SEM). The solids concentration of the suspension and the number of drops are such that a substantially single layer of powder particles is formed on the slide in order to prevent the powder particles from covering one another. The drops have to be applied quickly before the particles can separate according to size through sedimentation. After drying in air, the specimen is transferred into the measurement chamber of the SEM. In the present example, the SEM is an LEO 1530 appliance which is operated with a field emission electrode at 1.5 kV excitation voltage and a specimen spacing of 4 mm. At least 20 random excerpt magnifications with a magnification factor of 20 000 are taken of the specimen. These are each printed on a DIN A4 sheet together with the incorporated magnification scale. If possible, at least 10 freely visible $LiMPO_4$ particles from which the powder particles are formed together with the carbon-containing material are selected randomly on each of the at least 20 sheets, with the boundary of the $LiMPO_4$ particles being defined by the absence of solid, direct grown bridges. Bridges formed by carbon material, however, are counted as belonging to the particle boundary. For each of these selected $LiMPO_4$ particles, in each case the longest and shortest axes in projection are measured using a ruler and converted to the true particle dimensions on the basis of the scale ratio. For each measured $LiMPO_4$ particle, the arithmetic mean of the longest and shortest axes is defined as the particle diameter. Then, the $LiMPO_4$ particles are divided into size classes analogously to when using light-scattering measurement. If the number of associated $LiMPO_4$ particles is plotted against the size class, the result is the differential particle size distribution based on the number of particles. If the particle numbers are added cumulatively starting from the small particle classes up to the large particle classes, the cumulative particle size distribution is obtained, from which the D10, D50 and D90 values can be read directly on the size axis.

The method described is also applied to $LiMPO_4$-containing battery electrodes. In this case, however, a freshly cut or broken surface of the electrode is secured to the specimen slide and examined under an SEM rather than a powder sample.

The invention will now be explained in more detail on the basis of the non-limiting examples given below. In the appended figures.

EXAMPLES

Example 1

Production of $LiFePO_4$ Using a Process According to the Invention, Including Hydrothermal Treatment Reaction Equation $$FeSO_4.7H_2O + H_3PO_4 + 3LiOH.H_2O \rightarrow LiFePO_4 + Li_2SO_4 + 11H_2O$$

$LiFePO_4$ as finished product can be stored at room temperature in air without oxidation.

When producing $LiFePO_4$ in accordance with the reaction equation indicated, it should be noted that the $LiFe^{II}PO_4$ is precipitated from an aqueous $Fe^{II}$ precursor solution. Therefore, the reaction and drying/sintering are to be carried out under protective gas or vacuum in order to avoid partial oxidation of $Fe^{II}$ to form $Fe^{III}$, with the further formation of by-products, such as $Fe_2O_3$ or $FePO_4$.

Production and Precipitation of a Precursor Mixture 417.04 g of $FeSO_4.7H_2O$ are dissolved in approx. 1 l of distilled water and 172.74 g of 85% strength phosphoric acid are slowly added with stirring. The batch is then topped up to 1.5 l with distilled water. The acidic solution is placed in a laboratory autoclave (volume: 1 gallon) at a stirrer speed of 400 rpm, approx. 6-7 bar of nitrogen is applied to the autoclave via the immersion pipe and then this pressure is relieved again via the relief valve. The procedure is repeated twice.

188.82 g of lithium hydroxide $LiOH.H_2O$ are dissolved in 1 l of distilled water.

A dispersing means (IKA, ULTRATURRAX® UTL 25 Basic Inline with dispersion chamber DK 25.11) is connected, between relief valve and bottom outlet valve, to the autoclave in order to carry out the dispersing or milling treatment in accordance with the present invention. The pumping direction of the dispersing means is bottom outlet valve—dispersing means—relief valve. The dispersing means is started at a medium dispersing means is at a medium power level (13 500 rpm) in accordance with the manufacturer's instructions.

Then, the prepared LiOH solution is pumped into the autoclave via the immersion pipe using a prominent membrane pump (displacement 100%, 180 strokes/minute; corresponds to the highest power of the pump), followed by rinsing with approx. 500 to 600 ml of distilled water. The operation lasts approximately 20 minutes, during which the temperature of the suspension formed rises to approx. 35° C. After this pumping and rinsing, the suspension in the autoclave is heated to 50° C. A greenish-brown precipitate is formed after the addition of the lithium hydroxide.

The dispersing means, which is started before the addition of LiOH commences, is used in total for approximately 1 hour for intensive mixing or milling of the highly viscous suspension formed (after the LiOH solution has been pumped in at 50° C.). The particle size was then D90=13.2 μm. The volume-based D90 value was similar.

The following procedure can be used to measure the particle sizes in the precursor suspension: with reference to the method given before the examples for determining the particle size (distribution), 20 to 40 mg of the suspension are suspended in 15 ml of water and dispersed for 5 min using an ultrasound finger (rated power 25 Watts, 60% power). This is followed by immediate measurement in the measurement unit. The correct setting of the specimen quantity can be checked on an individual basis using the indication on the measurement unit (green measurement range).

The use of a dispersing means effects intensive mixing and deagglomeration of the precipitated viscous preliminary mixture. During the precipitation and crystallization of the precursor suspension which takes place, the pre-milling or intensive mixing in the dispersing means produces a homogenous mixture of a large number of small crystal nuclei of approximately equal size. These crystal nuclei crystallize during the subsequent hydrothermal treatment (cf. below) to form very uniformly grown crystals of the end product $LiFePO_4$ with a very narrow particle size distribution. The introducing of power or energy by means of the dispersing treatment amounted to more than 7 kW/m$^3$ or more than 7 kWh/m$^3$ respectively, in the treated precursor mixture/suspension.

Hydrothermal Treatment:

In each case the freshly prepared suspension is hydrothermally treated in a laboratory autoclave. Prior to heating of the suspension, the autoclave is purged with nitrogen in order to displace air which is present before the hydrothermal process from the autoclave. $LiFePO_4$ is formed above hydrothermal temperatures of approximately 100 to 120° C. After the hydrothermal process, the material is filtered off using the Seitz filter and washed. In detail:

After the dispersing means has been switched off and disconnected, the batch is heated to 160° C. over the course of 1.5 hours, and a hydrothermal treatment is carried out for 10 hours at 160° C. This is followed by cooling to 30° C. over the course of 3 hours.

Then the $LiFePO_4$ can be dried in air on in a drying cabinet, e.g. at mild temperatures (40° C.), without visible oxidation.

However, it is also possible for the material obtained as described above to be processed further as follows:

Filtration of the Lithium Iron Phosphate $LiFePO_4$

After the hydrothermal treatment, the cooled suspension (max. 30° C.) is pumped under a nitrogen atmosphere through the bottom outlet valve of the autoclave into a pressure filter (what is known as a Seitz filter). In the process, the prominent membrane pump is set in such a way that a pressure of 5 bar is not exceeded. The filter cake is subsequently washed with distilled water until the conductivity of the washing water drops below 200 μS/cm.

Drying and Deagglomeration of the Lithium Iron Phosphate $LiFePO_4$

The filter cake is pre-dried overnight in a vacuum drying cabinet at 70° C. to a residual moisture content of below 5% and is then dried further in a protective gas oven (Linn KS 80-S) under a stream of forming gas (90% $N_2$/10% $H_2$) of 200 l/h at 250° C. to a residual moisture content of <0.5%. Then, the $LiFePO_4$ is deagglomerated in a laboratory rotor mill (Fritsch Pulverisette 14) with a 0.08 mm screen.

Figure 1:
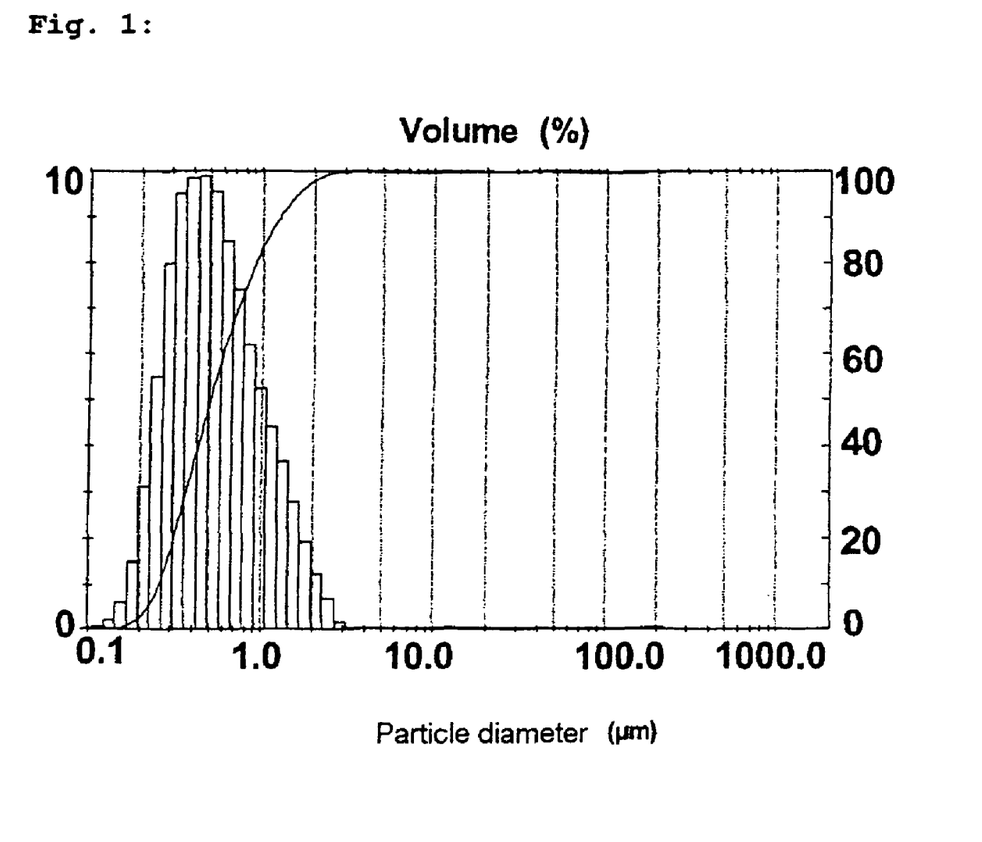
FIG. 1 shows the particle size distribution (volume-based) of an $LiMPO_4$ produced in accordance with the invention in accordance with Example 1.

The resulting typical particle size distribution of the finished $LiFePO_4$ (with dispersing means treatment, after hydrothermal treatment, drying and deagglomeration as described above) can be seen in FIG. 1. To clarify the advantageous particle size distribution and the absence of the disruptive larger particles in the products according to the invention, the volume-based data are illustrated. The values based on the particle fraction (%) were as follows: D50 value less than 0.5 μm; D10 value less than 0.35 μm; D90 value less than 2.0 μm; difference between the D90 value and the D10 value less than 1.5 μm.

The following procedure can be used to measure the particle sizes in a pulverulent specimen: with reference to the method described before the examples for determining the particle size (distribution), 20 to 40 mg of the powder specimen are suspended in 15 ml of water and dispersed for 5 min using an ultrasound finger (rate of power 25 Watts, 60% power). This is followed by immediate measurement in the measurement unit. The correct setting of the specimen quantity can be checked on an individual basis using the indication on the measurement unit (green measurement range).

Example 2

Production of $LiFePO_4$ Without Dispersing Means Treatment (Comparison)

Figure 2:
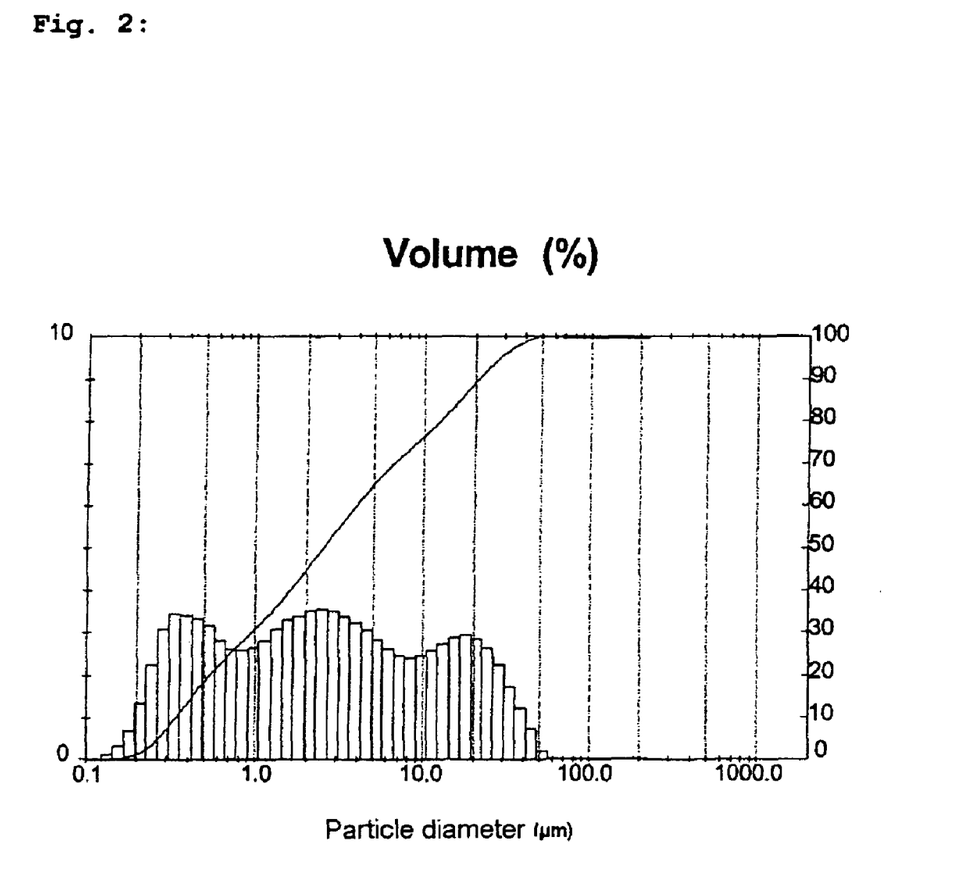
FIG. 2 shows the particle size distribution (volume-based) of an $LiMPO_4$ which was not produced in accordance with the invention, in accordance with Example 2.

For comparison purposes, $LiFePO_4$ was produced using the same synthesis process as that described in Example 1, but without use of the dispersing means in accordance with the invention. Under otherwise identical reaction conditions, a much wider particle size distribution with a higher proportion of grown agglomerate structures was obtained. Without the use of a dispersing means, the $D_{90}$ value (based on proportion by volume or on number of particles) after the addition of the LiOH solution was more than 200 µm. The considerably coarser particle size distribution of the finished $LiFePO_4$ (after hydrothermal treatment, drying and deagglomeration despite the $LiFePO_4$ likewise being in pure-phase form) is illustrated in FIG. 2. The volume-based data are shown in order to clarify the presence of disruptive larger particles. The shown on the proportion of particles. The D50 value, based on the proportion of particles (%), was over 0.8 µm.

An $LiFePO_4$ produced in accordance with US2003/0124423, page 10, paragraph [0015] was likewise unable, despite intensive milling using a pestle, to achieve the particle size distribution of the products according to the invention; it was not possible to attain a D50 value of less than 0.8 µm or a difference between the D90 and D10 values of 2 µm or below.

Example 3

Production of $LiFePO_4$ Using a Process According to the Invention Including Hydrothermal Treatment $LiFePO_4$ was produced using the same synthesis process as that described in Example 1, except that the dispersing means (IKA, ULTRATURRAX® UTL 25 Basic Inline with dispersing chamber DK 25.11) was operated at the highest power level. The introduction of power or energy by means of the dispersing treatment was more than 10 $kW/m^3$ or more than 10 $kWh/m^3$ respectively, in the treated precursor mixture/suspension. The particle size of the suspension following the dispersing means treatment was $D_{90}$=10.8 µm. The volume-based D90 value was slightly below this.

Figure 3:
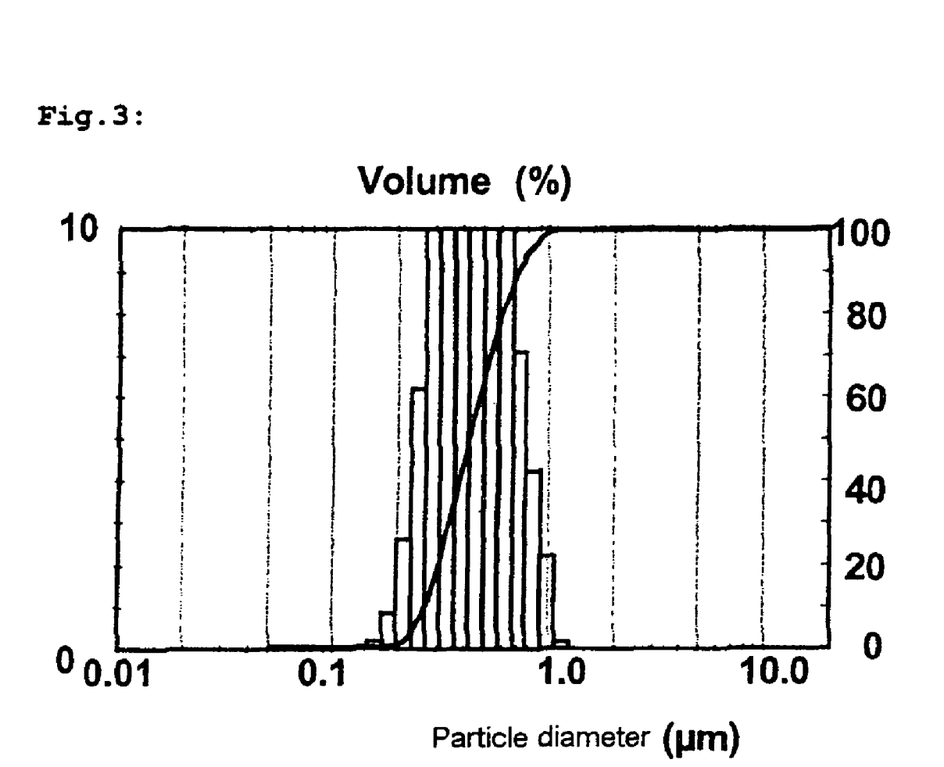
FIG. 3 shows the particle size distribution (volume-based) of an $LiMPO_4$ produced in accordance with the invention, in accordance with Example 3.

The hydrothermal treatment, filtration, drying and deagglomeration were carried out as described in Example 1. The typical particle size distribution which in this case results for the finished $LiFePO_4$ can be seen from FIG. 3. The volume-based data are illustrated with a view to clarifying the advantageous particle size distribution and the absence of the disruptive larger particles in the products according to the invention. The values based on the proportion of particles (%) were as follows: D50 value less than 0.5 µm; D10 value less than 0.35 µm; D90 value less than 2.0 µm; difference between the D90 value and the D10 value less than 1.0 µm.

In electrochemical tests, the $LiFePO_4$ according to the invention produced using the dispersing means had the best properties, in particular at high charging/discharging rates, compared to the comparative material produced without the use of a dispersing means and also compared to a material produced by a pure sintering process in accordance with the prior art.

Example 4

Production of $LiFePO_4$ Using a Process According to the Invention Including Hydrothermal Treatment 21.894 kg of $FeSO_4*7H_2O$ are dissolved in 42 l of deionized water, and 9.080 kg of 85% strength phosphoric acid are slowly added with stirring. The acidic solution is placed as initial charge in an enamelled 200 l autoclave with anchor agitator and is stirred at 45 rpm. The head space of the autoclave is purged with nitrogen before the autoclave is closed. The acidic solution is circulated using a centrifugal pump with an approx. 5 kW power consumption and a measured flow capacity of on average 7000 l/h. The solution is removed via the bottom outlet valve of the autoclave and fed back via a top flange. 10.289 kg of $LiOH*H_2O$ are dissolved in 62 l of deionized water. This alkaline solution is fed via a monopump and an injector nozzle to the circulated acidic solution on the delivery side of the centrifugal pump. This operation lasts 15 min, during which the temperature of the circulated solution rises from 18.3° C. to 42.1° C. The suspension formed is circulated for a further 45 min using the centrifugal pump and stirred using the anchor agitator at 45 rpm, during which process the temperature rises further to 51.1° C. According to the invention, throughout the entire operation the centrifugal pump with its high level of turbulence ensures that a fine-particle suspension is formed, and it was possible to achieve comparable particle size distributions to those achieved in Example 1. The introduction of power or energy via the dispersing treatment was more than 7 $kW/m^3$ or more than 7 $kWh/m^3$ respectively, in the treated precursor mixture/suspension.

After the external appliances had been switched off and disconnected, the autoclave is closed in a pressure-tight manner and heated, with continuous stirring at 90 rpm, to 160° C. over the course of 1.5 h and then held at this temperature for 10 h. It is then cooled to 20° C. over the course of 3 h, and the finished $LiFePO_4$ suspension is filtered in a Seitz filter analogously to Example 1. The pH of the filtrate is 7.5. It is then washed with deionized water until the filtrate has a conductivity of less than 480 µS. The whiteish-grey, solid filter cake, which has a tendency to flow, is dried overnight at 70° C. in a vacuum drying cabinet at <100 mbar and deagglomerated in a laboratory rotor mill (Fritsch Pulverisette 14) with a 0.08 mm screen. The particle size distributions then obtained where in the same range as that given in Example 1.

Example 5

Carburization of a Material Produced Using the Process According to the Invention 1 kg of dry $LiFePO_4$ powder from Examples 1 to 4 is intimately mixed with 112 g of lactose monohydrate and 330 g of deionized water and dried overnight in a vacuum drying cabinet at 70° C. and <100 mbar to give a residual moisture content of <5%. The hard, brittle dried product is broken by hand and coarse-milled in a disc mill (Fritsch Pulverisette 13) with a disc spacing of 1 mm and then transferred in stainless steel crucibles into a protective gas chamber oven (Linn KS 80-S). The latter is heated to 750° C. over 3 h under a stream of nitrogen of 200 l/h, held at this temperature for 5 h and then cooled to room temperature over the course of approx. 36 h. The carbon-containing product is deagglomerated in a laboratory rotor mill (Fritsch Pulverisette 14) with a 0.08 mm screen.

The SEM analysis of the particle size distribution as described before the examples for carbon-containing materials gave the following values: D50 value less than 0.6 µm, difference between D90 value and D10 value less than 1.5 µm.

In electrochemical tests on a thin-film electrode as disclosed, for example, in Anderson et al., Electrochem. And Solid State Letters 3 (2) (2000), pages 66-68, the carbon-containing material according to the invention, (starting from the product of Examples 1, 3 and 4) had the best properties, in particular at high charging/discharging rates, compared to the comparison material produced without the use of a dispersing means and a material produced by a pure sintering process in accordance with the prior art.

The invention claimed is:

1. A process for producing a compound of the formula $LiMPO_4$, comprising:
   a. producing a precursor mixture containing at least one $Li^+$ source, at least one $M^{2+}$ source and at least one $PO_4^{3-}$ source, wherein M comprises at least one metal from the first transition series; forming a precipitate and thereby to produce a precursor mixture or suspension;
   b. dispersing or milling the precursor mixture or suspension of (a) until the D90 value of particles in a precipitate of the precursor mixture or suspension are less than 50 µm; and
   c. obtaining $LiMPO_4$ from the precursor mixture or suspension of (b) by reaction under hydrothermal conditions.

2. The process according to claim 1, wherein the D90 value of the particles is at most 25 µm.

3. The process according to claim 1, wherein M comprises Fe.

4. The process according to claim 1, wherein M is Fe, Mn, Co, Ni or mixtures thereof.

5. The process according to claim 1, wherein the $LiMPO_4$ is in pure-phase form.

6. The process according to claim 1, wherein the dispersing or milling begins before or during precipitation of the particles in the precursor mixture or suspension and is continued until the precipitation has concluded.

7. The process according to claim 1, wherein evaporation does not occur prior to the reaction of the precursor mixture or suspension under hydrothermal conditions.

8. The process according to claim 1, wherein sintering does not take place prior to the reaction of the precursor mixture or suspension under hydrothermal conditions.

9. The process according to claim 1, wherein the $LiMPO_4$ is dried following the reaction under hydrothermal conditions.

10. The process according to claim 1, wherein the production of the precursor mixture or suspension or the reaction under hydrothermal conditions takes place in the presence of at least one further component that is a carbon-containing substance, an electron-conducting substance, the precursor of the electron-conducting substance, or mixtures thereof.

11. The process according to claim 10, wherein the electron-conducting substance is conductive carbon, carbon fibers or mixtures thereof.

12. The process according to claim 10, wherein the precursor of the electron-conducting substance comprises a sugar compound.

13. The process according to claim 1, wherein the $Li^+$ source is $LiOH$, $Li_2CO_3$ or mixtures thereof.

14. The process according to claim 1, wherein the $Fe^{2+}$ source is $FeSO_4$, $FeCl_2$, $FeNO_3$, $Fe_3(PO_4)_2$, an organyl salt of iron or mixtures thereof.

15. The process according to claim 1, wherein the $PO_4^{3-}$ source is phosphoric acid, a metal phosphate, hydrogen phosphate, dihydrogen phosphate or mixtures thereof.

16. The process according to claim 1 wherein water is a solvent for the precursor mixture or suspension.

17. The process according to claim 1, wherein the $Li^+$ source and the $M^{2+}$ source are in the form of aqueous solutions, and the $PO_3^{3-}$ source is in the form of a liquid or an aqueous solution.

18. The process according to claim 1, wherein the precipitate formed comprises at least one precursor of $LiMPO_4$.

19. The process according to claim 1, wherein the hydrothermal conditions comprise a temperatures between 100 and 250° C., and a pressure from 1 bar to 40 bar.

20. The process according to claim 1, wherein the components of the precursor mixture or suspension are present in a stoichiometric ratio of: a. 1 mole $Fe^{2+}$:1 mole $PO_4^{3-}$:1 mole Li*,
   b. 1 mole $Fe^{2+}$:1 mole $PO_4^{3-}$:3 mole Li*, or
   c. any mixing ratio between a. and b.

21. The process according to claim 1, wherein the reaction under hydrothermal conditions takes place under an inert gas atmosphere.

22. The process according to claim 1, wherein the $M^{2+}$ source and the $PO_4^{3-}$ source are first mixed in an aqueous solvent under an inert gas atmosphere, followed by the addition of the $Li^+$ source under a protective gas or inert atmosphere, and then the reaction under hydrothermal conditions is carried out.

23. The process according to claim 1, wherein the dispersing or milling comprises a treatment with dispersing apparatuses that are stirrers, mills, intensive mixers, centrifugal pumps, in-line mixtures, mixing nozzles, injector nozzles, ultrasound appliances or combinations thereof.

24. The process according to claim 1, wherein a stirring mechanism is used for the dispersing or milling conducted along with the introduction of power, calculated according to the formula $P=2\pi nM$, where M represents the torque and n represents the rotational speed, being at least 5 kW/m$^3$.

25. The process according to claim 10, wherein the further component is used as a crystallization nucleus in the precursor mixture or solution.

26. The process of claim 1, wherein the $LiMPO_4$ has a mean particle size, D50 value of less than 0.8 µm.

27. The process of claim 1, wherein the D10 value of the particles is less than 0.4 µm and the D90 value is less than 3.0 µm.

28. The process of claim 1, wherein the difference between the D90 value and the D10 value of the particles is no more than 2 µm.

29. The process of claim 1, wherein the BET surface area of the particles is more than 3.5 m$^2$/g.

30. The process according to claim 1, wherein the $LiMPO_4$, after the hydrothermal treatment is separated off by filtration or centrifuging, is dried and deagglomerated.

31. The process according to claim 1, wherein the $LiMPO_4$, obtained from the hydrothermal treatment is mixed with at least one carbon precursor material, by kneading.

32. The process according to claim 31, wherein the mixed material produced is dried and heated to a temperature between 500° C. and 1000° C., during which operation the carbon precursor material is pyrolyzed to form carbon.

33. The process according to claim 32, wherein the pyrolysis process is followed by a milling or deagglomeration treatment.

34. The process according to claim 32, wherein the drying is carried out under a protective gas, in air or in vacuo at temperatures of from 50° C. to 200° C., and the pyrolysis is carried out under a protective gas.

35. $LiMPO_4$ particles produced by the process of claim 1, wherein said particles have a particle size distribution such that their D90 value is less than 3.0 µm, and the difference between the D90 value of the particles and the D10 value is no more than 2 µm.

36. The $LiMPO_4$ particles of claim 35, wherein the D90 value of said particles is less than 2.0 µm.

37. LiMPO$_4$ particles of claim 35, wherein the difference between the D90 and the D10 value is less than 1.5 μm.

38. LiMPO$_4$ particles of claim 35, wherein the difference between the D90 and the D10 value is less than 1.0 μm.

39. LiMPO$_4$ particles of claim 35, wherein the difference between the D90 and the D10 value is less than 0.5 μm.

* * * * *